UNITED STATES PATENT OFFICE.

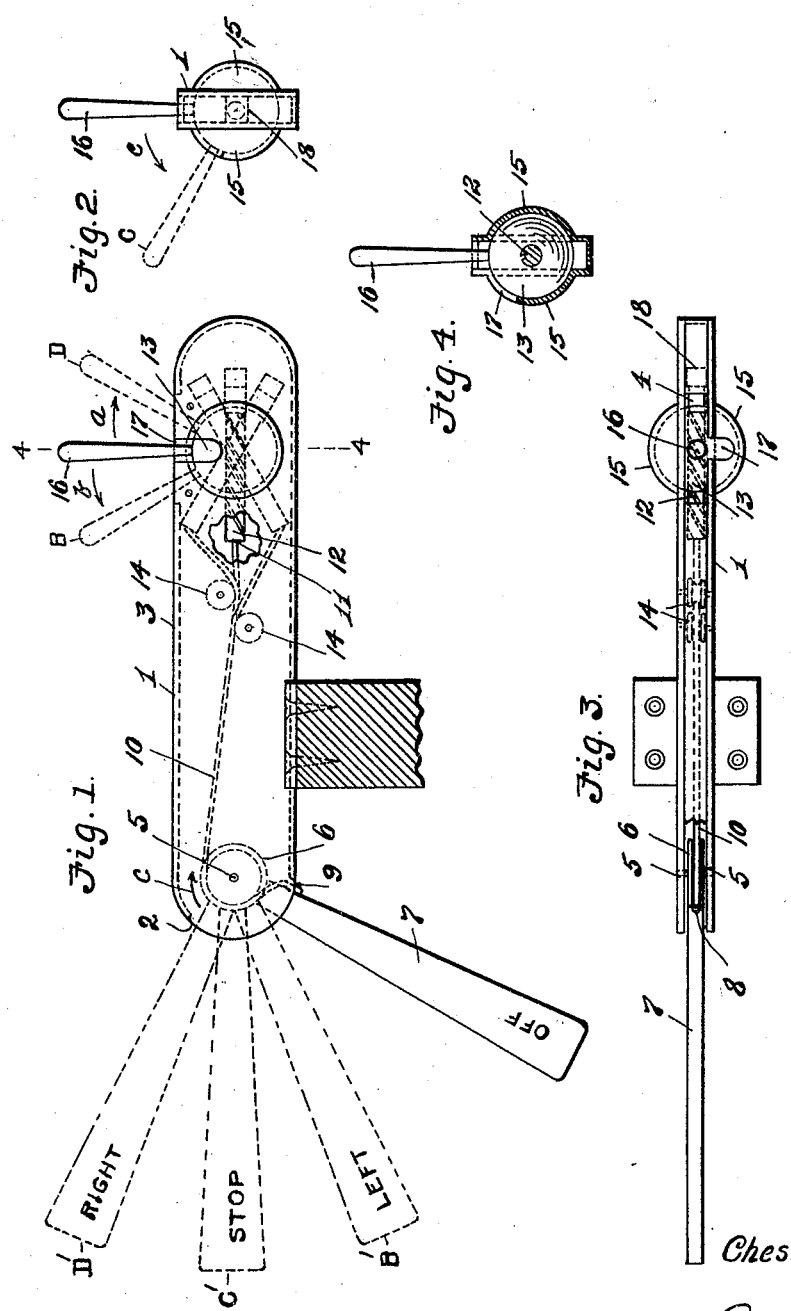

CHESTER A. PERKINS, OF SOUTH BEND, INDIANA.

VEHICLE-SIGNAL.

1,397,778.     Specification of Letters Patent.     Patented Nov. 22, 1921.

Application filed November 29, 1920. Serial No. 427,118.

*To all whom it may concern:*

Be it known that I, CHESTER A. PERKINS, a citizen of the United States, residing at South Bend, in the county of St. Joseph and State of Indiana, have invented certain new and useful Improvements in Vehicle-Signals, of which the following is a specification.

The invention relates to vehicle signals of the type which is manually operated, and has for its object to provide a signal of this character comprising a casing having pivotally mounted in one end thereof a pulley provided with an arm, which arm is adapted to be moved in various positions in a vertical plane for indicating to an approaching vehicle, the direction of turn the operator intends to take or the intention of the operator to stop the vehicle. Also to provide means for rotating the pulley, said means comprising a cable extending over said pulley, and having its end secured, the other end of said cable passing between idlers and connected to a longitudinally movable screw threaded in a ball frictionally held within a socket of the casing, said ball being provided with a handle whereby it and its screw may be rocked in its frictional socket for imparting a pull on the cable for moving the signal arm upwardly or downwardly.

A further object is to provide means whereby when the handle of the ball is moved at right angle to the casing, the threaded screw will move axially in either direction for imparting a pull on the casing or allowing the cable to move outwardly for allowing the signal arm to lower. Also to provide the inner end of the screw with a rectangular shaped portion slidably engaging the sides of the casing, said rectangular shaped portion preventing rotation of the screw when the frictionally held ball is rocked transversely.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the signaling device.

Fig. 2 is an end view of the device.

Fig. 3 is a top plan view.

Fig. 4 is vertical sectional view taken on line 4—4 of Fig. 1.

Referring to the drawings, the numeral 1 designates an elongated casing having its forward end opened as at 2 and its upper side 3 provided with an elongated opening 4 adjacent its rear end. Rotatably mounted in bearings of the sides of the casing 1 adjacent its forward end are the pintles 5 of a pulley 6. The pulley 6 is provided with an integral arm 7 which is a signaling arm and which arm extends outwardly through the opened end 2 of the casing, said arm 7 being adapted to be moved to various positions in a vertical plane for indicating and signaling to an approaching vehicle in the contemplated turning or stopping of the vehicle on which the signal is disposed. Extending over the pulley 6 and passing through an aperture 8 is the signaling arm 7 and secured to the under edge of the signaling arm 7 as at 9 is an operating cable 10, by means of which cable the signaling arm 7 is moved to various positions in a vertical plane. Cable 10 extends rearwardly through the chamber of the casing 1 and is secured as at 11 to a longitudinally disposed operating screw 12 which threads through the rockable ball 13. Cable 10 passes between pulleys 14 which guide the cable in its inward and outward movement, and also form bending points for the cable as its inner end is moved upwardly or downwardly to the dotted line positions B and D indicated in dotted lines in Fig. 1.

The rockable ball 13 is disposed in semi-spherical recesses 15 in the opposite walls of the casing 1 and is frictionally held therein, said frictional engagement being sufficient to maintain the signaling arm 7 in any position to which it may be moved. Extending upwardly from the ball 13 and through the elongated opening 4 is an operating handle 16 which handle is adapted to be grasped by the operator for rocking the frictionally held ball 13 outwardly or inwardly in the direction of the arrow $a$ or in the direction of the arrow $b$. One side of the casing 1 is cut away as at 17 thereby allowing the handle to be rocked in the direction of the arrow $c$, which will cause the ball 13 to rock and consequently will cause an axial movement of the screw 12 rearwardly thereby imparting a pull on the cable 10. During the axial movement of the screw 12 the rectangular shaped portion 18 which engages the inner faces of the sides of the casing 1 will prevent rotation of the screw as the ball 13 is rocked to the position C shown in Fig. 2. The signal arm 7 is normally in the full line position shown in Fig. 1 of the drawing with the handle 16 in vertical position. However if the operator desires to signal to an approaching vehicle that he intends to stop, the handle 16 is moved transversely into the cutaway portion 17. This will cause the ball 13 to rock, thereby causing the screw 12 to move axially rearwardly through the ball and impart a pull on the cable 10, thereby causing the signal arm 7 to assume the position C' shown in dotted lines in Fig. 1. During this action the rectangular portion 18 of the screw will prevent said screw from rotating with the ball 13. The ball 13 being frictionally held, it will be seen that the operator will not have to maintain his hand on the lever 16 for holding the signaling arm 7 in horizontal position. When the operator desires to make a turn to the left he grasps the handle 16 and moves the same forwardly to the position B, which action will rock the forward end of the screw 12 downwardly thereby causing the cable 10, which passes over the lower pulley 14 to move inwardly slightly for imparting a partial rotation to the pulley 6 in the direction of the arrow c, thereby causing the signaling arm 7 to move to the position B' and indicating to the approaching vehicle to the rear or forwardly of the vehicle on which the signal is located, that the operator is going to make a left turn. In this case the ball is also frictionally held, and if so desired the operator may after setting the signal use his hands for steering purposes in making the turn. When it is desired to indicate a right turn the handle is moved in the direction of the arrow b to the dotted line position D, which action will cause the forward end of the screw 12 to move upwardly until the arm 7 assumes the position D' as indicated in dotted lines in Fig. 1.

From the above it will be seen that a manually operated vehicle signal of the pivoted arm type is provided which is simple in construction, and one wherein a plurality of positions of the arm may be obtained with a minimum number of parts.

The invention having been set forth what is claimed as new and useful is:—

1. The combination with a rockable member, of an actuator for imparting variable rockable movements to the rockable member, said actuator comprising a casing in which the rockable member is pivoted, a forwardly and rearwardly rockable ball rockably mounted in a friction bearing of the casing, a screw threaded through said ball, a cable connected to the forward end of said screw, spaced rollers between which the cable is disposed, the forward end of said cable passing over the rockable member and having its end anchored and means whereby said ball may be rocked for imparting variable movements to the rockable member.

2. The combination with a rockable member, of an actuator for imparting variable rockable movements to the rockable member, said actuator comprising a casing in which the rockable member is pivoted, a forwardly and rearwardly rockable ball rockably mounted in a friction bearing of the casing, a screw threaded through said ball, a cable connected to the forward end of said screw and passing forwardly, spaced rollers between which the cable is disposed, the forward end of said cable passing over the rockable member and having its end anchored, means whereby the ball may be rocked forwardly or rearwardly for imparting variable movement to the rockable member, means whereby the ball may be rocked transversely for imparting axial movement to the screw and means for preventing rotation of the screw during the movement of the ball.

3. The combination with a rockably member, of an actuator for imparting variable rockable movements to the rockable member, said actuator comprising a casing in which the rockable member is pivoted, a forwardly, rearwardly and transversely rockable ball mounted in a friction bearing of the casing, a screw threaded through said ball, a cable connected to said screw and passing over the rockable member and having its end anchored, rollers adjacent one end of the screw and disposed to each side of the cable, and means for preventing rotation of the screw in the ball when said ball is moved to various positions.

4. An actuating device for imparting variable movements to a cable, said device comprising a casing, a ball mounted in said casing, a screw threaded through said ball and having one of its ends connected to the cable, means whereby said ball may be rocked forwardly, rearwardly and transversely for imparting variable movements to the cable and means for preventing rotation of the screw during the movement of the ball.

In testimony whereof I affix my signature.

CHESTER A. PERKINS.